Feb. 14, 1956     T. BRENDEL ET AL     2,734,422
PHOTOGRAPHIC OBJECTIVE COMPRISING TWO OUTER CONVERGENT SINGLE
ELEMENTS AND TWO INNER DIVERGENT MENISCUS DOUBLETS
Filed Feb. 27, 1952
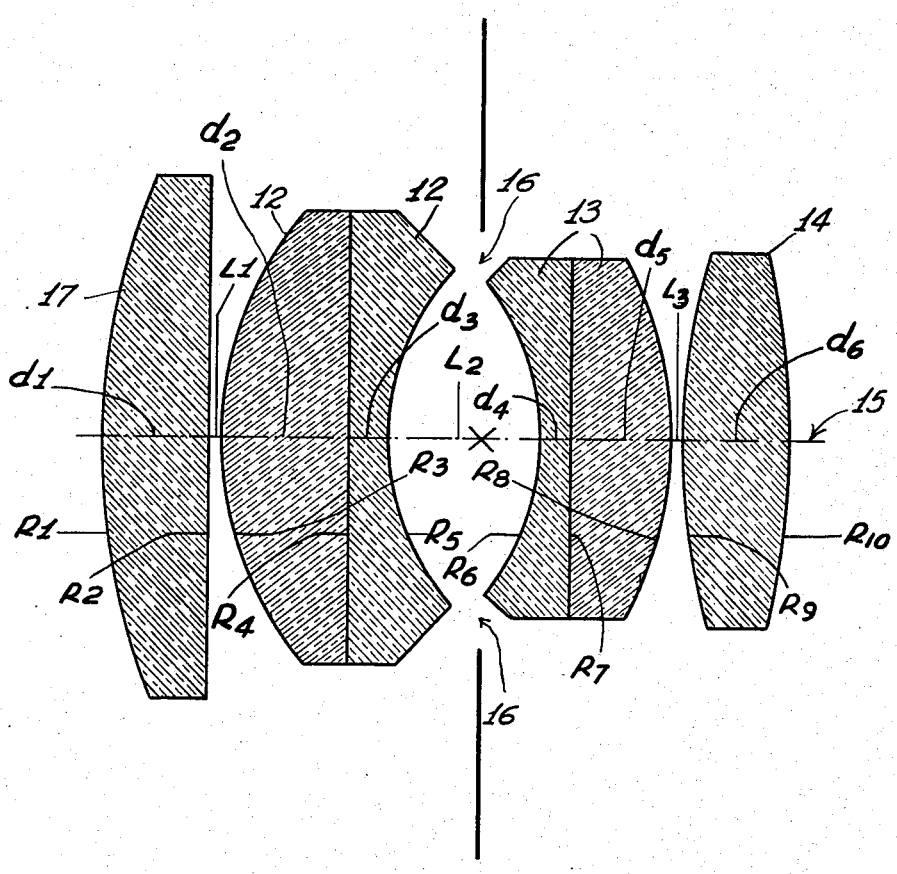
INVENTORS
Theodor Brendel
Hans Lautenbacher
BY Stanley Wolder
ATTORNEY United States Patent Office
2,734,422
Patented Feb. 14, 1956

2,734,422

PHOTOGRAPHIC OBJECTIVE COMPRISING TWO OUTER CONVERGENT SINGLE ELEMENTS AND TWO INNER DIVERGENT MENISCUS DOUBLETS

Theodor Brendel and Hans Lautenbacher, Munich, Germany, assignors, by mesne assignments, to Agfa Camera-Werk Aktiengesellschaft, a corporation of Germany Application February 27, 1952, Serial No. 273,695

Claims priority, application Germany March 15, 1951

11 Claims. (Cl. 88—57)

This invention relates to a photographic objective of extreme aperture of the type which is corrected for spherical, comatic, astigmatic and chromatic aberration, for field-curvature and distortion, having disturbed symmetry in construction, being especially designed for cine cameras and having four components made of customary optical glasses and separated from one another by air spaces, of which components the two outer are single convergent elements, while the two inner comprise cemented menisci and are of negative power and located with their concave surfaces facing one another with the diaphragm between them and having cemented surfaces, the radius of which is numerically greater than three times the total focal length.

In this type of objective, which is known to be derived from the Gauss' double-objective, it has been shown that with increase of the relative aperture it becomes very difficult to effect the removal of all aberrations to a sufficiently far-reaching extent and sufficiently uniformly so that for all points of the necessary image size (e. g. of 8 mm. film) a resolving power of the optical system is attained such as is necessary, for example, in the case of the short focal lengths of cine camera lenses on account of the required capacity for enlargement of the image and of the fine grain of the film material used.

The present invention is based on the observation that even using lens forms which may be manufactured in a simple manner such as those with very shallow, suitably plane cemented surfaces and even with an extreme aperture of f/1.5, the simultaneous removal of all aberrations can be effected to such an extent that the resolving power of the optical system over an image field of about 28° (the necessary angle for a cine camera lens) amounts to about 0.5% of the focal length of the objective, if the positive parts of the cemented components on both sides of the diaphragm consist of a glass of which the refractive index for the D-line ranges between 1.65 and 1.75 and at the same time the absolute value of the sum of the individual focal lengths of the negative parts of the two cemented components is greater than 0.9 times and less than 1.2 times the total focal length of the objective.

The sum of the focal lengths of the negative parts of both menisci on account of the very shallow cemented surfaces is essentially equal to the sum of reciprocal surface powers of both concave surfaces $R_5$ and $R_6$. The extreme relative aperture makes it necessary to keep the typically critical concave surfaces $R_5$ and $R_6$ as shallow as possible for the total correction in general and for the correction in spherical aberration of oblique pencils in particular, that means, to reduce the aberration coefficients to a minimum. The increase of field curvature resulting from the relatively shallow concave surfaces $R_5$ and $R_6$ will be compensated by applying glasses having a mean refractive index of more than 1.65 in the positive parts of both cemented menisci. The aim of the invention will be attained only by simultaneously realising the conditions mentioned above.

An especially favorable correction, primarily of chromatic aberration, can be attained in an objective according to this invention when the difference between the Abbe values $V=(n_D-1)/(n_F-n_C)$ for the positive and the negative part of the two cemented components is less than 16.

The further important advantage in the finishing of the objective can also be achieved in the latter case, that the two cemented joints may be on plane surfaces.

Other objects and a fuller understanding of the present invention may be had by referring to the following tables, taken in conjunction with the accompanying drawing which illustrates a preferred embodiment thereof, it being understood that the foregoing statement of the objects of the invention and the foregoing description therein contained, are intended to generally explain the same without limiting it in any manner.

The numerical data values given in the tables for the radii, thicknesses and separating distances apply to an objective of focal length f=100. The relative aperture amounts to 1:1.5, i. e. the objective is f/1.5.

Table I

| Radii | Thicknesses separating distances | Types of Glass | |
|---|---|---|---|
| | | $N_D$ | V |
| $r_1=+$ 87.233 | $d_1=14.512$ | 1.62309 | 58.1 |
| $r_2=+465.412$ | $l_1=0.482$ | | |
| $r_3=+$ 43.833 | $d_2=16.482$ | 1.66713 | 48.2 |
| $r_4=\infty$ | $d_3=$ 4.824 | 1.64744 | 33.8 |
| $r_5=+$ 29.346 | $l_2=19.376$ | | |
| $r_6=-$ 34.861 | $d_4=$ 3.899 | 1.65744 | 33.8 |
| $r_7=\infty$ | $d_5=13.547$ | 1.66713 | 48.2 |
| $r_8=-$ 45.867 | $l_3=$ 0.482 | | |
| $r_9=+101.503$ | $d_6=13.547$ | 1.62040 | 60.5 |
| $r_{10}=-144.734$ | | | |

Table II

| Radii | Thicknesses separating distances | Types of Glass | |
|---|---|---|---|
| | | $N_D$ | V |
| $r_1=+$ 86.727 | $d_1=13.956$ | 1.62280 | 60.3 |
| $r_2=+279.121$ | $l_1=$ 0.498 | | |
| $r_3=+$ 43.463 | $d_2=16.448$ | 1.71700 | 47.9 |
| $r_4=\infty$ | $d_3=$ 4.984 | 1.64769 | 33.9 |
| $r_5=+$ 28.610 | $l_2=19.439$ | | |
| $r_6=-$ 35.887 | $d_4=$ 3.987 | 1.66680 | 33.1 |
| $r_7=\infty$ | $d_5=12.461$ | 1.71700 | 47.9 |
| $r_8=-$ 49.843 | $l_3=$ 0.399 | | |
| $r_9=+$ 93.705 | $d_6=15.950$ | 1.62278 | 56.9 |
| $r_{10}=-150.526$ | | | |

Table III

| Radii | Thicknesses separating distances | Types of Glass | |
|---|---|---|---|
| | | $N_D$ | V |
| $r_1 = + 87.754$ | | | |
| | $d_1 = 13.961$ | 1.62280 | 60.4 |
| $r_2 = +398.880$ | | | |
| | $l_1 = 0.399$ | | |
| $r_3 = + 42.880$ | | | |
| | $d_2 = 16.952$ | 1.65844 | 50.8 |
| $r_4 = \infty$ | | | |
| | $d_3 = 4.986$ | 1.63636 | 35.4 |
| $r_5 = + 28.719$ | | | |
| | $l_2 = 19.445$ | | |
| $r_6 = - 34.503$ | | | |
| | $d_4 = 3.989$ | 1.64769 | 33.9 |
| $r_7 = +349.019$ | | | |
| | $d_5 = 13.462$ | 1.66672 | 48.4 |
| $r_8 = - 46.071$ | | | |
| | $l_3 = 0.399$ | | |
| $r_9 = +101.415$ | | | |
| | $d_6 = 12.964$ | 1.64250 | 58.1 |
| $r_{10} = -148.582$ | | | |

As may be observed from the drawing, the component lens elements therein set forth consist of a single convergent element 11, a first cemented meniscus of negative power 12, a second cemented meniscus of negative power 13, the two menisci being so arranged so that their concave surfaces confront one another, and a fourth element comprising a single convergent element 14, the said elements being so arranged so that their optical centers and foci fall upon a single line 15, the aperture 16 of the camera with which the objectives intended to be used lies in a plane which intersects line 15 at point X thereof.

The considerations which fix the spaces between the lens elements have been fully described above and examples given in tables.

Although the subject invention has been described with a certain degree of particularity, it is understood that the present disclosure has been made only by way of example and that numerous additions and changes in the details of construction, combination and arrangement may be resorted to without transcending the scope of the invention as hereinafter claimed.

What is claimed is:

1. A photographic objective corrected for spherical and chromatic aberrations, astigmatism, coma, field-curvature and distortion, having disturbed symmetry in construction, being especially designed for cine cameras, comprising four components made of customary optical glasses and separated from each other by air spaces, of which components the two outer are convergent single elements, and the two inner components comprise cemented menisci of negative power, their concave surfaces facing each other, and having cemented surfaces, the radius of which is numerically greater than three times the total focal length, the positive parts of the cemented components having a refractive index for the D-line of the spectrum ranging between 1.65 and 1.75, the absolute value of the sum of the individual focal lengths of the negative parts of the two cemented components being greater than 90% and less than 120% of the focal length of the objective.

2. A photographic objective as claimed in claim 1, in which at least one of the two cemented joints are on plane surfaces.

3. A photographic objective as claimed in claim 1, the difference between the Abbe values $$V = (n_D - 1)/(n_F - N_C)$$

for the positive and the negative parts of the two cemented components being less than 16, at least one of the two cemented joints being on plane surfaces.

4. A compound photographic objective comprising four components of conventional optical glasses mounted in axial alignment, the two outer components being single convergent elements and the two inner components being cemented menisci of negative power, each such menisci including a negative part and a positive part, said positive parts each having a refractive index for the D-line of the spectrum of at least 1.65, the concave surfaces of said menisci facing each other, the absolute value of the sum of the focal lengths of the negative parts of said menisci being greater than 90% of the focal length of the objective, but not greater than 120% thereof.

5. A compound photographic objective as described in claim 4, the difference between the Abbe values $$V = (n_D - 1)/(n_F - N_C)$$

for the positive and the negative parts of each of the two cemented components being less than 16, the cemented surfaces of said menisci being planar.

6. A compound photographic lens system but not greater than 120% thereof, intended especially for motion picture cameras, corrected for spherical, comatic and chromatic aberrations, astigmatism, field curvature and distortion, comprising four components of conventional optical glass, mounted in optical-axial alignment and separated by air spaces, the two outer components being convergent single elements and the two inner components comprising cemented menisci of negative power, each such menisci including a negative part having an outside concave surface and a positive part cemented to the inside surface of such negative part, the concave surfaces of said menisci being disposed in confronting relationship, said positive parts of said menisci having a refractive index for the D-line of the spectrum of at least 1.65 but not more than 1.75, the absolute value of the sum of the individual focal lengths of the negative parts of said menisci being greater than 90% of the focal length of the system but not greater than 120% thereof, said objective system being intended to be positioned with relation to the aperture of a camera with which the system is employed so that one of said convergent elements and one of said menisci lie in front of said aperture and the remaining elements lie behind said aperture.

7. A lens system as described in claim 6, the difference between the Abbe values $V = (n_D - 1)/(n_F - N_C)$ for the positive and negative parts of each of the menisci being less than 16 and greater than 10, the radius of the cemented surfaces of each of said menisci being numerically greater than three times the total focal length of the system.

8. A lens system as described in claim 6, in which at least one of the cemented surfaces of said menisci are planar.

9. An optical objective having numerical data substantially as follows:

Table I

[Focal length = 100   f/1.5]

| Radii | Thicknesses separating distances | Types of Glass | |
|---|---|---|---|
| | | $N_D$ | V |
| $r_1 = + 87.233$ | | | |
| | $d_1 = 14.512$ | 1.62309 | 58.1 |
| $r_2 = +465.412$ | | | |
| | $l_1 = 0.482$ | | |
| $r_3 = + 43.833$ | | | |
| | $d_2 = 16.482$ | 1.66713 | 48.2 |
| $r_4 = \infty$ | | | |
| | $d_3 = 4.824$ | 1.64744 | 33.8 |
| $r_5 = + 29.346$ | | | |
| | $l_2 = 19.376$ | | |
| $r_6 = - 34.861$ | | | |
| | $d_4 = 3.899$ | 1.64744 | 33.8 |
| $r_7 = \infty$ | | | |
| | $d_5 = 13.547$ | 1.66713 | 48.2 |
| $r_8 = - 45.867$ | | | |
| | $l_3 = 0.482$ | | |
| $r_9 = +101.503$ | | | |
| | $d_6 = 13.547$ | 1.62040 | 60.5 |
| $r_{10} = -144.734$ | | | | in which $r_1, r_2 \ldots$ represent the radii of curvature of the individual lens surfaces, the plus and minus values indicating surfaces respectively convex and concave to the front, $d_1, d_2 \ldots$ represent the thickness of the individual lens elements, $l_1, l_2$ and $l_3$ represent the air spacing between the lens elements along the optical axis, the subscript numbering proceeding in order from front to rear of the lens system.

10. An optical objective having numerical data substantially as follows:

Table II

[Focal length=100  f/1.5]

| Radii | Thicknesses separating distances | Types of Glass | |
|---|---|---|---|
| | | $N_D$ | V |
| $r_1 = + 86.727$ | | | |
| $r_2 = +279.121$ | $d_1 = 13.956$ | 1.62280 | 60.3 |
| $r_3 = + 43.463$ | $l_1 = 0.498$ | | |
| $r_4 = \infty$ | $d_2 = 16.448$ | 1.71700 | 47.9 |
| $r_5 = + 28.610$ | $d_3 = 4.984$ | 1.64769 | 33.9 |
| $r_6 = - 35.887$ | $l_2 = 19.439$ | | |
| $r_7 = \infty$ | $d_4 = 3.987$ | 1.66680 | 33.1 |
| $r_8 = - 49.843$ | $d_5 = 12.461$ | 1.71700 | 47.9 |
| $r_9 = + 93.705$ | $l_3 = 0.399$ | | |
| $r_{10} = -150.526$ | $d_6 = 15.950$ | 1.62278 | 56.9 | in which $r_1, r_2 \ldots$ represent the radii of curvature of the individual lens surfaces, the plus and minus values indicating surfaces respectively convex and concave to the front, $d_1, d_2 \ldots$ represent the thickness of the individual lens elements, $l_1, l_2$ and $l_3$ represent the air spacing between the lens elements along the optical axis, the subscript numbering proceeding in order from front to rear of the lens system.

11. An optical objective having numerical data substantially as follows:

Table III

[Focal length=100  f/1.5]

| Radii | Thicknesses separating distances | Types of Glass | |
|---|---|---|---|
| | | $N_D$ | V |
| $r_1 = + 87.754$ | | | |
| $r_2 = +393.880$ | $d_1 = 13.961$ | 1.62280 | 60.3 |
| $r_3 = + 42.880$ | $l_1 = 0.399$ | | |
| $r_4 = \infty$ | $d_2 = 16.952$ | 1.65844 | 50.8 |
| $r_5 = + 28.719$ | $d_3 = 4.986$ | 1.63636 | 35.4 |
| $r_6 = - 34.503$ | $l_2 = 19.445$ | | |
| $r_7 = +349.019$ | $d_4 = 3.989$ | 1.64769 | 33.9 |
| $r_8 = - 46.071$ | $d_5 = 13.462$ | 1.66672 | 48.4 |
| $r_9 = +101.415$ | $l_3 = 0.399$ | | |
| $r_{10} = -148.582$ | $d_6 = 12.964$ | 1.64250 | 58.1 | in which $r_1, r_2 \ldots$ represent the radii of curvature of the individual lens surfaces, the plus and minus values indicating surfaces respectively convex and concave to the front, $d_1, d_2 \ldots$ represent the thickness of the individual lens elements, $l_1, l_2$ and $l_3$ represent the air spacing between the lens elements along the optical axis, the subscript numbering proceeding in order from front to rear of the lens system.

References Cited in the file of this patent

UNITED STATES PATENTS

| 583,336 | Rudolph | May 25, 1897 |
| 2,349,893 | Warmisham et al. | May 30, 1944 |
| 2,416,032 | Warmisham | Feb. 18, 1947 |
| 2,532,751 | Baker | Dec. 5, 1950 |

FOREIGN PATENTS

| 157,040 | Great Britain | Jan. 20, 1921 |
| 547,666 | Great Britain | Sept. 7, 1942 |